(12) United States Patent  
Chen et al.

(10) Patent No.: US 8,243,213 B2  
(45) Date of Patent: Aug. 14, 2012

(54) MONITOR APPARATUS

(75) Inventors: Yun-Lung Chen, Taipei Hsien (TW); Zhong-Hai Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 586 days.

(21) Appl. No.: 12/422,348

(22) Filed: Apr. 13, 2009

(65) Prior Publication Data

US 2010/0149438 A1     Jun. 17, 2010

(30) Foreign Application Priority Data

Dec. 12, 2008   (CN) ..................... 2008 2 0303372 U

(51) Int. Cl.
  *H04N 5/64*   (2006.01)
  *H05K 5/00*   (2006.01)
(52) U.S. Cl. .............. 348/836; 361/679.06; 361/679.07; 361/679.22
(58) Field of Classification Search ............... 348/836; 361/679.06, 679.07, 679.22; 248/917, 919–923
  See application file for complete search history.

(56) References Cited

U.S. PATENT DOCUMENTS

| | | | | |
|---|---|---|---|---|
| 253,457 A * | 2/1882 | Weiderer | .................. | 248/471 |
| 3,246,908 A * | 4/1966 | Marvin | .................. | 280/29 |
| 3,806,986 A * | 4/1974 | Wentworth | .................. | 16/18 R |
| 4,054,964 A * | 10/1977 | Kaneko | .................. | 16/20 |
| 4,783,879 A * | 11/1988 | Weaver | .................. | 16/34 |
| 5,412,838 A * | 5/1995 | Yang | .................. | 16/26 |
| 5,758,935 A * | 6/1998 | Coonan | .................. | 312/223.3 |
| 6,223,388 B1 * | 5/2001 | Sey | .................. | 16/46 |
| 6,288,891 B1 * | 9/2001 | Hasegawa et al. | ........ | 361/679.07 |
| 6,367,748 B1 * | 4/2002 | Solomon et al. | .............. | 248/129 |
| 6,532,628 B2 * | 3/2003 | Kim | .................. | 16/342 |
| 6,651,943 B2 * | 11/2003 | Cho et al. | .................. | 248/122.1 |
| 6,678,153 B2 * | 1/2004 | Chen et al. | .................. | 361/679.21 |
| 6,822,857 B2 | 11/2004 | Jung et al. | | |
| 6,854,159 B2 * | 2/2005 | Ruitenbeek | .................. | 16/18 R |
| 6,985,907 B2 * | 1/2006 | Zambo et al. | .................. | 1/1 |
| 7,129,996 B2 * | 10/2006 | Maruta | .................. | 348/794 |
| 7,137,603 B2 * | 11/2006 | Solomon et al. | .............. | 248/129 |
| 7,301,759 B2 * | 11/2007 | Hsiung | .................. | 361/679.27 |
| 7,320,451 B2 * | 1/2008 | Ogawa | .................. | 248/161 |
| 7,441,786 B2 * | 10/2008 | Stryker et al. | ............. | 280/79.11 |
| 7,600,294 B2 * | 10/2009 | Hartman | .................. | 16/30 |
| 7,636,133 B1 * | 12/2009 | Hsu | .................. | 348/794 |
| 7,649,576 B2 * | 1/2010 | Ogawa et al. | .................. | 348/794 |
| 7,839,626 B2 * | 11/2010 | Chen et al. | .................. | 361/679.07 |
| 7,922,133 B2 * | 4/2011 | Hsu | .................. | 248/127 |
| 2005/0001114 A1 * | 1/2005 | Ogawa | .................. | 248/127 |
| 2006/0032998 A1 * | 2/2006 | Depay | .................. | 248/291.1 |
| 2006/0187625 A1 | 8/2006 | Jung et al. | | |
| 2007/0075208 A1 * | 4/2007 | Chen | .................. | 248/455 |
| 2007/0210221 A1 * | 9/2007 | Kim et al. | .................. | 248/124.1 |
| 2011/0174170 A1 * | 7/2011 | Fritz et al. | .................. | 100/35 |

* cited by examiner

*Primary Examiner* — Branon Painter
*Assistant Examiner* — Elizabeth A Plummer
(74) *Attorney, Agent, or Firm* — Altis Law Group, Inc.

(57) ABSTRACT

A monitor apparatus includes a monitor main body and a monitor stand pivotably connected with the monitor main body. A pair of rolling members is attached to a base of the monitor main body. The monitor stand and the rolling members are seated on a same plane for supporting the monitor main body. The monitor main body is capable of rotating about an axis parallel or vertical to the plane.

16 Claims, 5 Drawing Sheets

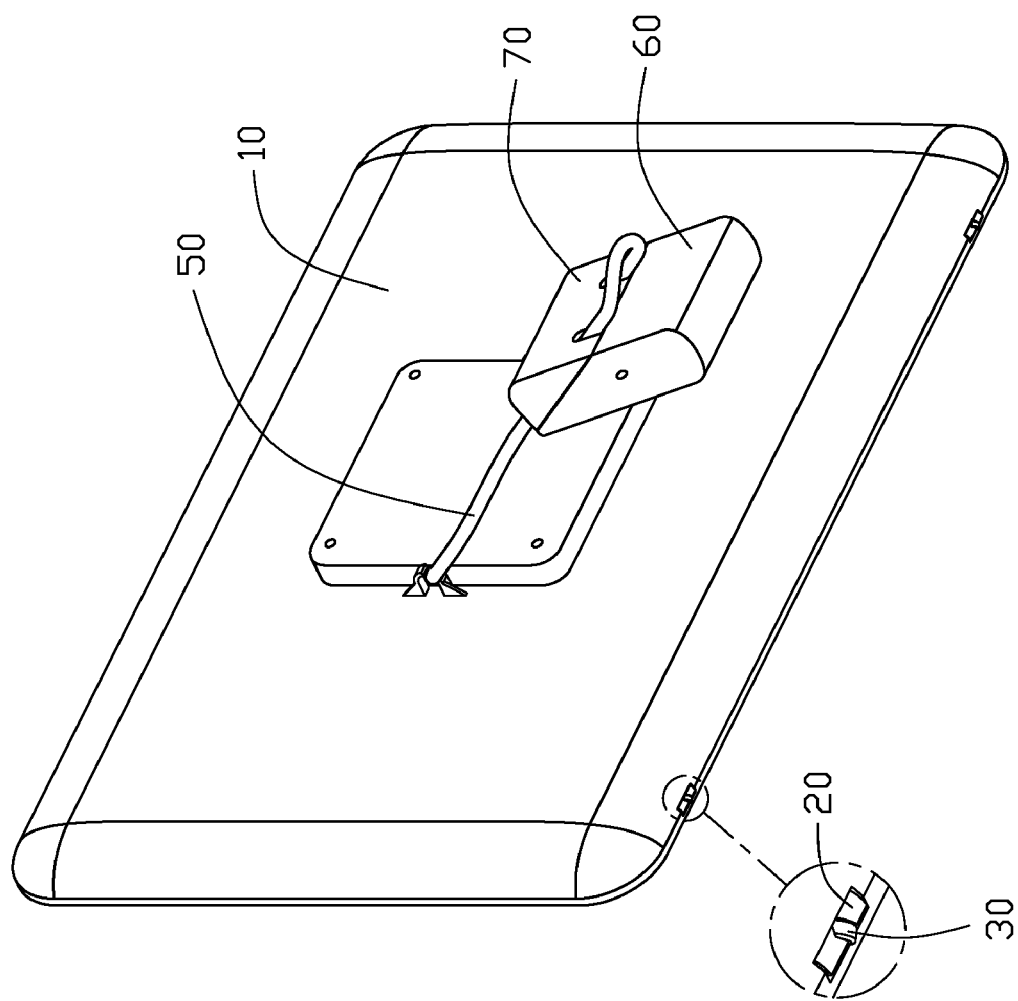

MONITOR APPARATUS

BACKGROUND

1. Technical Field

The present disclosure relates to monitor apparatuses and, more particularly, to a monitor apparatus with wheels for facilitating adjusting a viewing angle of the monitor.

2. Description of Related Art

As display technology develops, monitors are developed that are increasingly smaller in volume and lighter in weight. A typical monitor apparatus includes a base member stably seated on a horizontal plane such as a desk, a monitor main body adapted to display a picture thereon, a connecting member connecting the base member to the monitor main body, and a monitor hinge connecting the upper part of the connecting member to the monitor main body. Thus, the monitor main body can be tilted upwards or downwards to a desired viewing angle. However, because of sliding friction between the base member and the plane, movement of the monitor is not smooth during angle adjustments.

Thus, a monitor apparatus which conveniently adjusts a viewing angle is desired.

BRIEF DESCRIPTION OF THE DRAWINGS

FIG. 5 is an assembled view of FIG. 1.

DETAILED DESCRIPTION OF THE EMBODIMENTS

Figure 1:
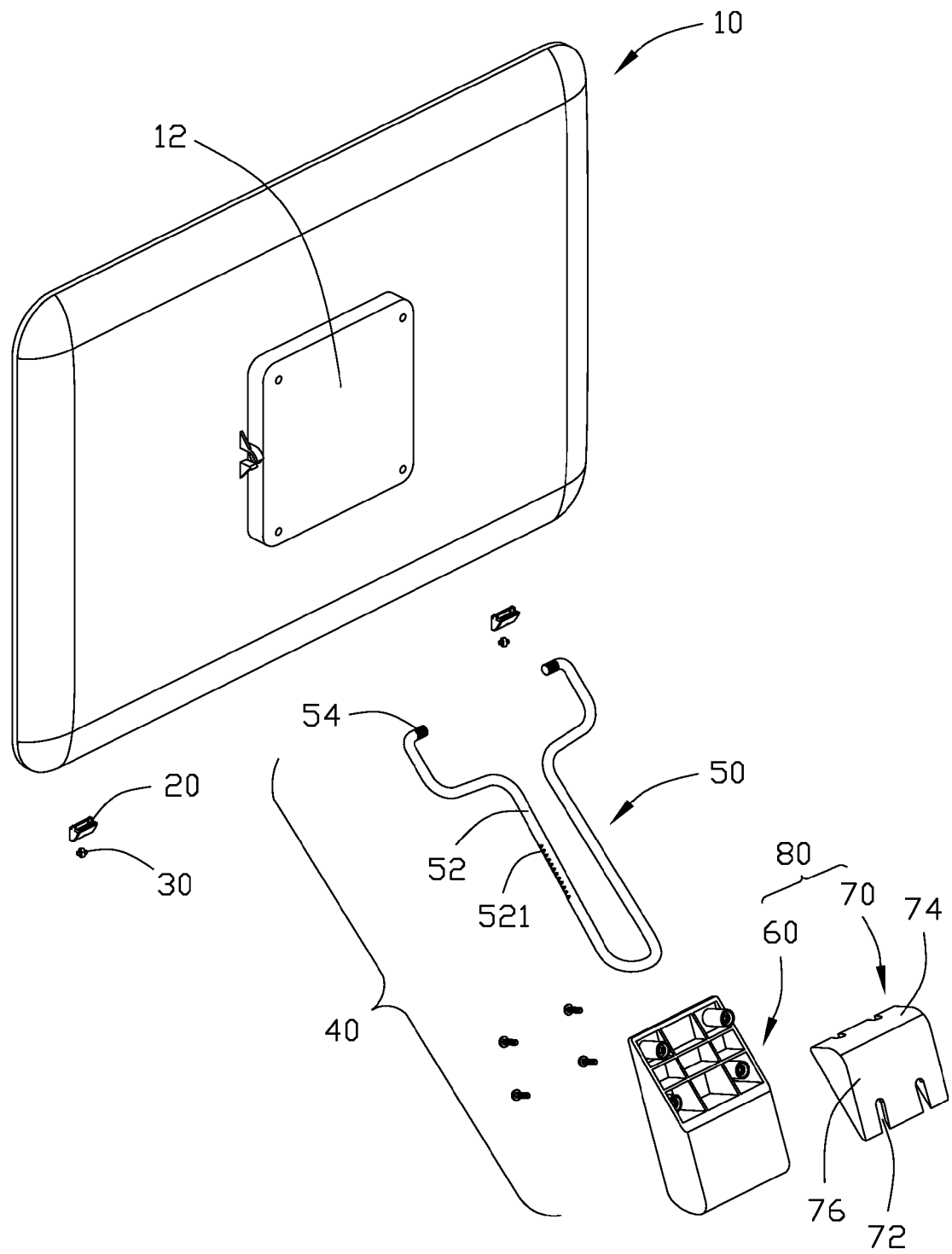
FIG. 1 is an exploded, isometric view of an embodiment of a monitor apparatus, the monitor apparatus including a monitor main body, a pair of holding members, a pair of rolling members, and a monitor stand, the monitor stand including a connecting member and a base stand, the base stand including a main portion and a cover portion.

Referring to FIG. 1, an embodiment of a monitor apparatus includes a monitor main body 10, a pair of holding members 20, a pair of rolling members 30, and a monitor stand 40. The monitor stand 40 includes a connecting member 50 and a base stand 80. The base stand 80 includes a main portion 60 and a cover portion 70.

Figure 2:
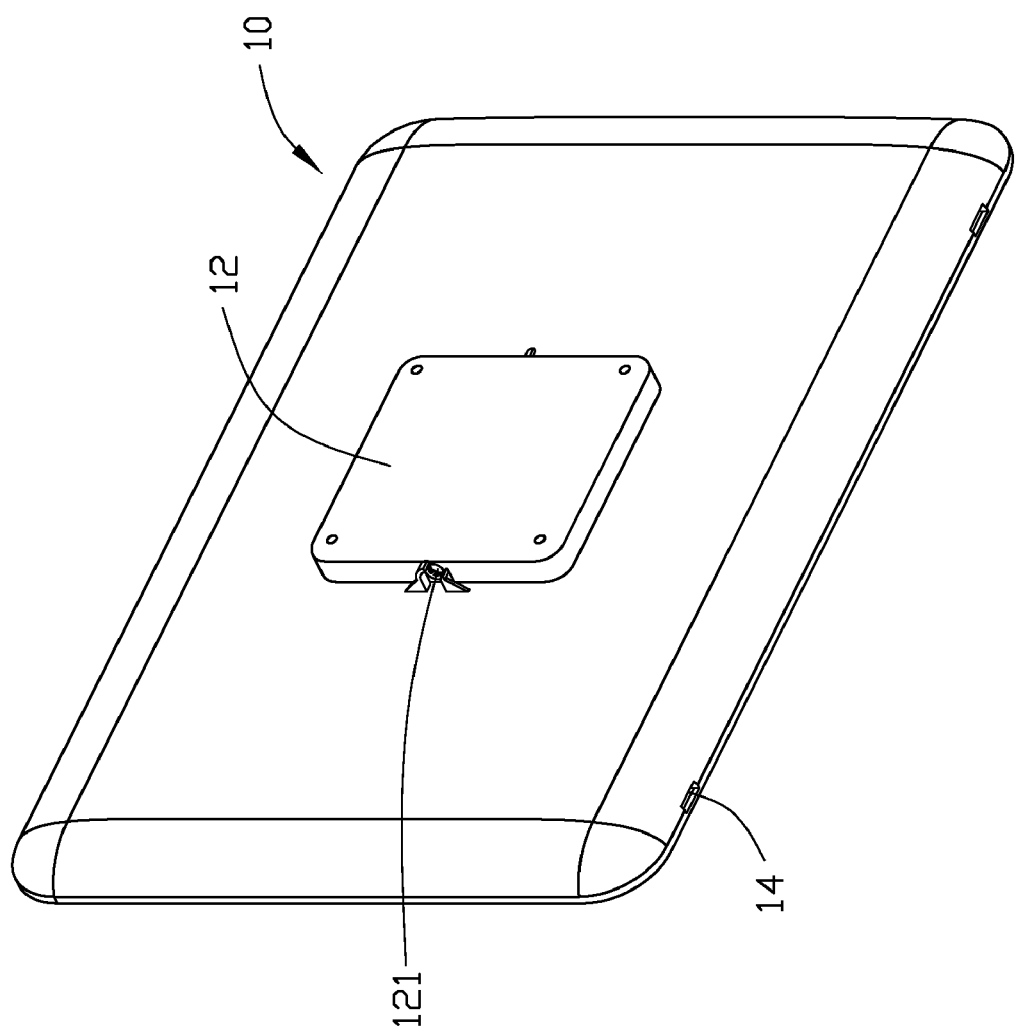
FIG. 2 is an isometric view of the monitor main body of FIG. 1.

Referring to FIG. 2, the monitor main body 10 includes a protruded portion 12 at a back side thereof. A pair of pivot holes 121 is respectively defined in two opposite sides of the protruded block 12. A pair of grooves 14 for receiving the holding members 20 therein is defined in a base of the monitor main body 10.

Figure 3:
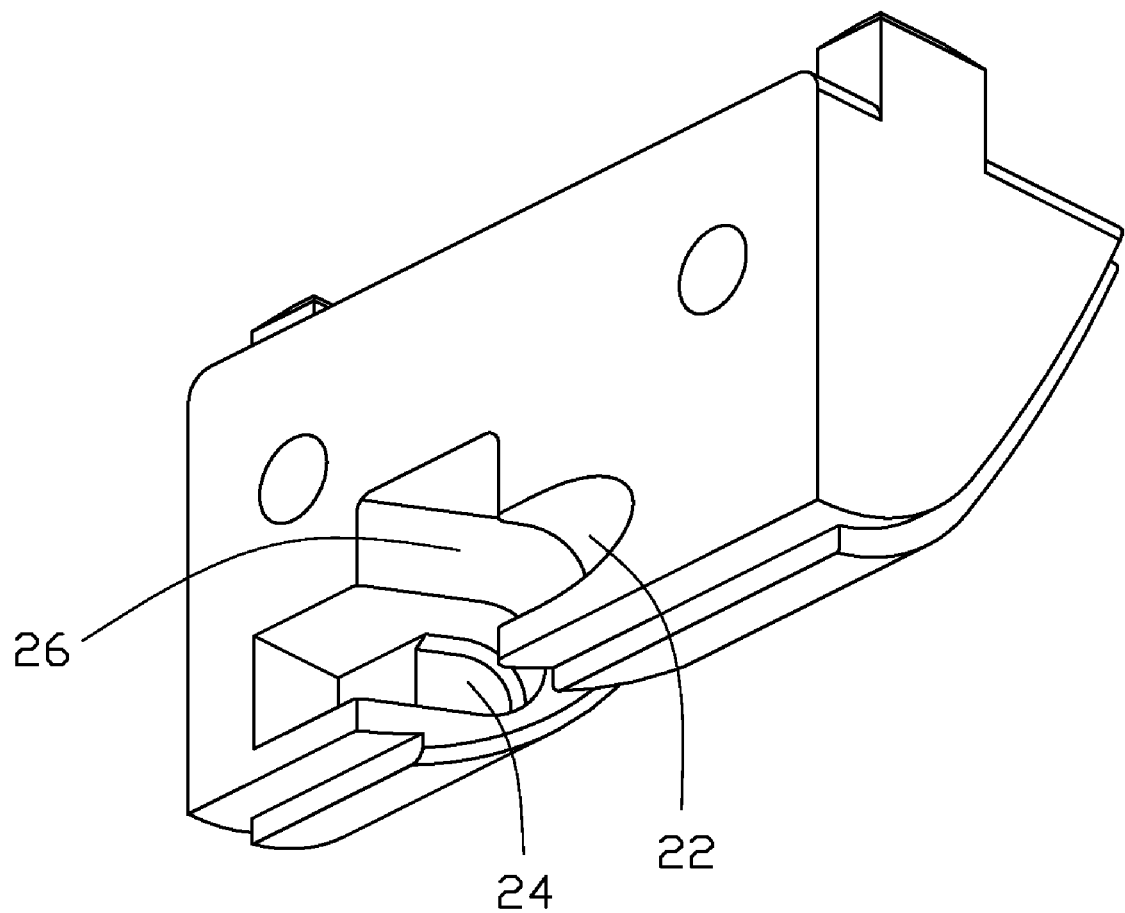
FIG. 3 is an isometric view of one of the holding members and one of the rolling members of FIG. 1.
Figure 3:
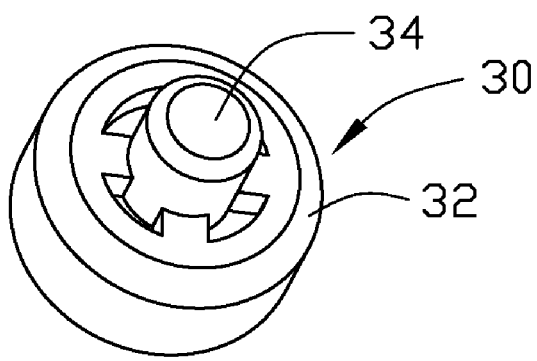

Referring to FIG. 3, a pair of pivot slots 22, 24, and an arc-shaped holding slot 26 are defined in each of the holding members 20. Each of the rolling members 30 includes a wheel and an axial post 34 extending though a central axis of the wheel 32. Two ends of the axial post 34 of the rolling member 30 engage in the pivot slots 22, 24. The wheel 32 is received in the holding slot 26 of the holding member 20 and capable of rolling in the holding slot 26.

The connecting member 50 may be symmetrically shaped and includes a pair of arm sections 52 and a pair of distal ends 54 for engaging with the pivot holes 121 of the monitor main body 10. At least one of the arm sections 52 defines a first friction structure 521. The connecting member 20 may be wire like, firm and elastic.

Figure 4:
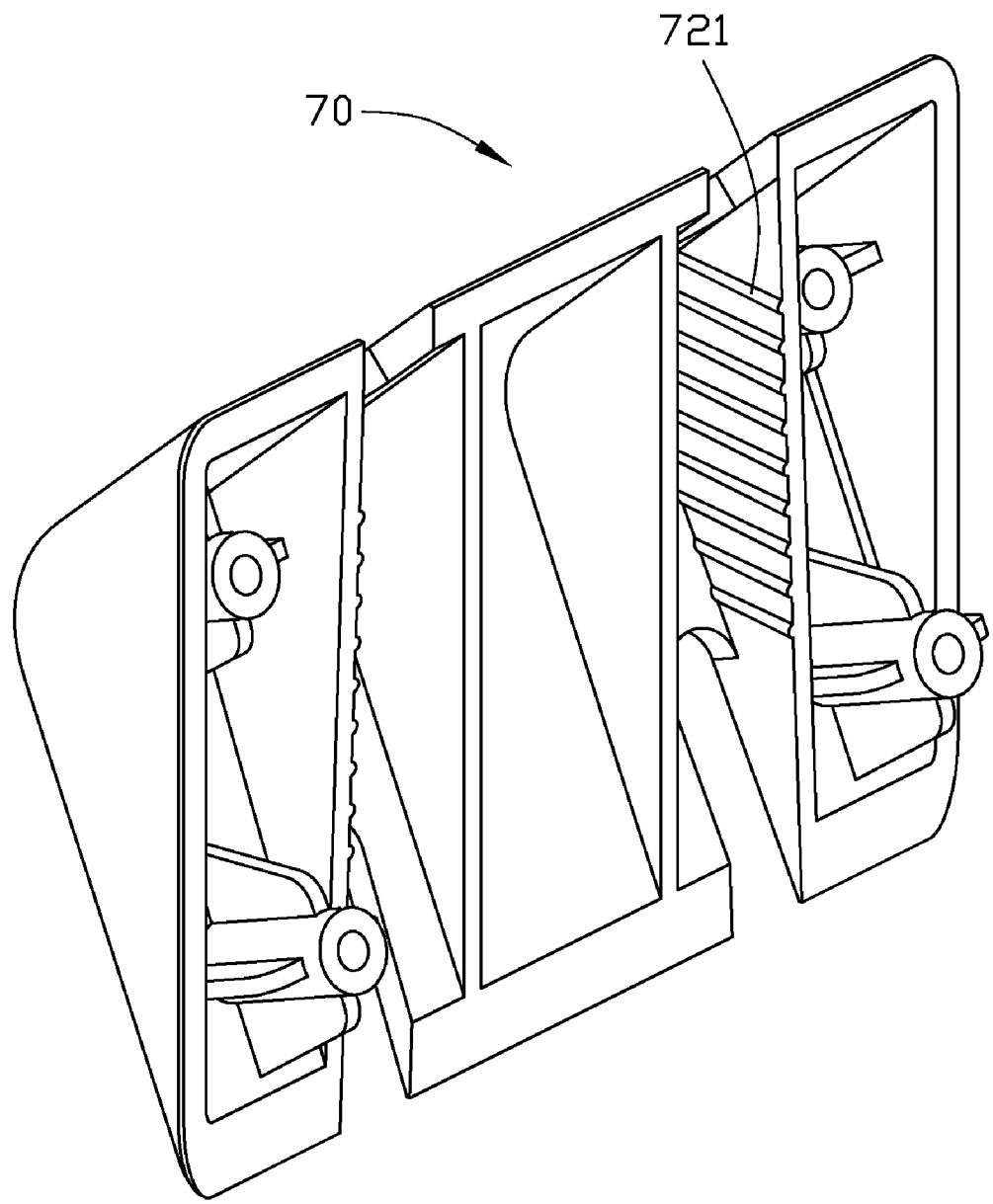
FIG. 4 is an isometric view of the cover portion of FIG. 1.

Referring to FIG. 4, a cross section of the cover portion 70 may be triangle-shaped. The cover portion 70 includes a top surface 74 and a side surface 76 substantially perpendicularly connecting with the top surface 74. A pair of inclined slots 72 is defined in the cover portion 70 and extends through the top surface 74 and the side surface 76 for receiving the arm sections 52 of the connecting member 50 therein. A second friction structure 721 is formed beside the inclined slots 72 to engage with the first friction structure 521 of the connecting member 50 and prevent unexpected sliding movement of the connecting member 50 along the inclined slots 72.

Referring to FIG. 5, in assembly, the arm sections 52 of the connecting member 50 are engaged in the inclined slots 72 of the cover portion 70. The cover portion 70 is secured to the main portion 60 by fasteners such as screws. The distal ends 54 of the connecting member 50 are engaged in the pivot holes 121 of the monitor main body 10. The arm sections 52 of the connecting member 50 are slidable along the slot 72 of the cover portion 70 along an inclined direction to a predetermined height. The first friction structure 521 of the connecting member 50 is engaged with the second friction structure 721 beside the slots 72 of the cover portion 70, thereby fixing the connecting member 50 at the predetermined height. The monitor main body 10 is capable of rotating about the distal ends 54 of the connecting member 50 and fixed at a desired tilting angle because of friction between the monitor main body 10 and the distal ends 54 of the connecting member 50. Two ends of the axial post 34 of each of the rolling members 30 engage with the pivot slots 22, 24 of one corresponding holding member 20. The wheel 32 of each of the rolling members 30 engages with the holding slot 26 of one corresponding holding member 20 and pivotally attaches to the base of the monitor main body 10.

To adjust an angle between the monitor main body 10 and a horizontal plane on which the monitor apparatus is seated, the monitor main body 10 is rotated downwards or upwards about a horizontal axis. Sliding movement of the arm sections 52 of the connecting member 50 along the inclined slots 72 of the cover portion 70 can also allow adjustment of the angle between the monitor main body 10 and a horizontal plane.

When rotating the monitor main body 10 right or left to adjust the viewing angle, the wheels 32 of the rolling members 30 attached at the base of the monitor main body 10 roll along the plane. In the illustrated embodiment, the rolling members 30 are symmetrically attached at two sides of the base of the monitor main body 10. A direction of the axial post 34 of the rolling member 30 is deviated from the vertical or horizontal. Thus, the monitor main body 10 smoothly and easily rotates about a vertical axis.

While the present disclosure has been illustrated by the description of embodiments thereof, and while the embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. A monitor apparatus comprising:
   a monitor main body with a pair of rolling members attached to a base thereof; and
   a monitor stand pivotably connected with the monitor main body;

wherein the monitor stand and the rolling members are seated on a same plane, the monitor main body is capable of rotating about a first axis substantially parallel to the plane or rotating about a second axis substantially perpendicular to the plane; each of the pair of rolling members is rotatable about an inclined axis that is inclined relative to the plane, and the pair of rolling members is movable in opposite directions to allow the monitor main body to rotate about the second axis; the monitor stand comprises a base stand and a connecting member extending through and slidably engaged with the base stand, the monitor main body is pivotally connected with the connecting member, and the connecting member comprises a closed end protruding from a first side of the base stand and an open end protruding from a second side of the base stand.

2. The monitor apparatus of claim 1, wherein the connecting member comprises a pair of arm sections symmetrically extending from the closed end to the open end and a pair of distal ends pivotally engaged in a pair of pivot holes of the monitor main body, respectively.

3. The monitor apparatus of claim 2, wherein the base stand comprises a main portion and a cover portion attached on the main portion; and a pair of inclined slots is defined in the cover portion to engagingly receive the arm sections of the connecting member.

4. The monitor apparatus of claim 3, wherein a cross section of the cover portion is triangle-shaped, the cover portion includes a top surface, a side surface, and an inclined inner surface connected between the top surface and the side surface; and the pair of inclined slots extends through the top surface and the side surface along the inclined inner surface.

5. The monitor apparatus of claim 1, wherein each of the rolling members comprises a wheel pivotally attached to the base of the monitor main body and an axial post extending through a central portion of the wheel, and the axial post is oriented in the same direction as the inclined axis.

6. The monitor apparatus of claim 5, further comprising a pair of holding members attached to the monitor main body; wherein a pair of grooves is defined in the base of the monitor main body to receive the holding members; and each of the holding members defines a pair of pivot slots to receive two ends of the axial post of the rolling member, and a holding slot to receive the wheel of the rolling member.

7. A monitor apparatus comprising:
a monitor main body;
a pair of rolling members attached to the monitor main body to rollably movably support the monitor main body in a first direction; and
a monitor stand pivotally connected with the monitor main body and supporting the monitor main body in a second direction different from the first direction, the monitor stand comprising a base stand and a connecting member slidably attached to the base stand, the connecting member comprising a closed end extending through the base stand and an open end pivotably engaged with the monitor main body, and the closed end and the open end protruding from different sides of the base stand;
wherein the monitor main body is rotatable about a first axis and a second axis perpendicular to the first axis.

8. The monitor apparatus of claim 7, wherein the connecting member further comprises a pair of arm sections symmetrically extending from the closed end to the open end, and each of the pair of arm sections comprises a distal end reaching the open end and pivotably engaged with the monitor main body.

9. The monitor apparatus of claim 8, wherein the monitor main body comprises a protruded portion at a back side thereof; a pair of pivot holes is defined in two sides of the protruded portion; and the distal ends of the connecting member are engaged in the pivot holes of the monitor main body.

10. The monitor apparatus of claim 9, wherein the base stand comprises a main portion and a cover portion attached on the main portion; and a pair of inclined slots is defined in the cover portion to engagingly receive the arm sections of the connecting member.

11. The monitor apparatus of claim 10, wherein a cross section of the cover portion is triangle-shaped; the cover portion includes a top surface, a side surface, and an inclined inner surface connecting between the top surface and the side surface; and the pair of inclined slots extend through the top surface and the side surface along the inclined surface.

12. The monitor apparatus of claim 7, wherein the connecting member is symmetrically structured, and made of a bent rod that is hard and elastic.

13. The monitor apparatus of claim 7, wherein each of the rolling members comprises a wheel and an axial post extending through a central portion of the wheel.

14. The monitor apparatus of claim 13, further comprising a pair of holding members attached to the monitor main body; wherein a pair of grooves is defined in a base of the monitor main body for receiving the holding members; and each of the holding members defines a pair of pivot slots to receive two ends of the axial post of the rolling member, and a holding slot to receive the wheel of the rolling member.

15. The monitor apparatus of claim 13, wherein a direction of the axial post of the rolling member is inclined relative to the first or second axis, the first axis is substantially parallel to a plane on which the monitor apparatus is seated, and the second axis is substantially perpendicular to the plane.

16. The monitor apparatus of claim 15, wherein each of the pair of rolling members is rotatable about an inclined axis that is inclined relative to the plane, and the pair of rolling members is movable in opposite directions to allow the monitor main body to rotate about the second axis.

* * * * *